United States Patent
Lasson et al.

(10) Patent No.: US 12,358,383 B2
(45) Date of Patent: Jul. 15, 2025

(54) CHARGING SYSTEM AND METHOD FOR CHARGING A BATTERY OF AN ELECTRIC VEHICLE

(71) Applicant: Volvo Car Corporation, Gothenburg (SE)

(72) Inventors: Anders Lasson, Gothenburg (SE); Robert Eriksson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 817 days.

(21) Appl. No.: 17/510,487

(22) Filed: Oct. 26, 2021

(65) Prior Publication Data

US 2022/0144104 A1    May 12, 2022

(30) Foreign Application Priority Data

Nov. 12, 2020   (EP) ..................................... 20207157

(51) Int. Cl.
*H02J 7/00*   (2006.01)
*B60L 1/00*   (2006.01)
(Continued)

(52) U.S. Cl.
CPC ............... *B60L 53/11* (2019.02); *B60L 1/003* (2013.01); *H02M 3/02* (2013.01)

(58) Field of Classification Search
CPC .......... B60L 53/00; B60L 53/10; B60L 53/11; H02J 7/00; H02J 7/0044
(Continued)

(56) References Cited

U.S. PATENT DOCUMENTS

2019/0097436 A1*   3/2019   Ing .......................... B60L 3/0007
2019/0225095 A1*   7/2019   Hiroe ....................... B60L 58/15
(Continued)

FOREIGN PATENT DOCUMENTS

EP        3543063 A2    9/2019
WO     2019082776 A1    5/2019

OTHER PUBLICATIONS

Apr. 22, 2021 European Search Report issued in International Application No. 20207157.

*Primary Examiner* — Alexis B Pacheco
(74) *Attorney, Agent, or Firm* — Clements Bernard Walker; Christopher L. Bernard

(57) ABSTRACT

A charging system for charging an electric vehicle battery, including a charging inlet connected to an external direct current (DC) charging station providing a predefined charging inlet voltage, a battery having a nominal voltage of 400V or 800V connected to the charging inlet, the battery including two 400V-battery units, and a voltage outlet, the voltage outlet supplying an output voltage to an auxiliary component connected to the voltage outlet having a nominal voltage corresponding to the nominal voltage of the battery, a DC/DC converter converting the charging inlet voltage into the nominal voltage of the auxiliary component, and at least three circuit breakers being arranged to connect the two 400V-battery units to form a charging circuit having a nominal charging voltage corresponding to the supplied charging inlet voltage and/or to selectively integrate the DC/DC converter into the charging circuit to provide the auxiliary component with the nominal voltage during charging.

14 Claims, 2 Drawing Sheets

(51) Int. Cl.
*B60L 53/10* (2019.01)
*H02J 7/14* (2006.01)
*H02M 3/02* (2006.01)

(58) Field of Classification Search
USPC .......................................................... 320/132
See application file for complete search history.

(56) References Cited

U.S. PATENT DOCUMENTS

| | | | |
|---|---|---|---|
| 2020/0262302 A1* | 8/2020 | Zappaterra | B60L 53/11 |
| 2021/0078429 A1* | 3/2021 | Li | B60L 58/21 |
| 2021/0078442 A1* | 3/2021 | Prasad | B60L 58/19 |
| 2021/0091575 A1* | 3/2021 | Li | B60L 3/0061 |
| 2021/0138920 A1* | 5/2021 | Bernardini | B60L 1/20 |
| 2021/0257843 A1* | 8/2021 | Mituta | B60L 53/62 |
| 2022/0097536 A1* | 3/2022 | Heydel | B60L 53/16 |
| 2022/0231537 A1* | 7/2022 | Hirota | H02J 7/16 |
| 2024/0235216 A1* | 7/2024 | Lee | H02J 7/0047 |

\* cited by examiner

CHARGING SYSTEM AND METHOD FOR CHARGING A BATTERY OF AN ELECTRIC VEHICLE

CROSS-REFERENCE TO RELATED APPLICATION

The present disclosure claims the benefit of priority of co-pending European Patent Application No. 20 207 157.7, filed on Nov. 12, 2020, and entitled "CHARGING SYSTEM AND METHOD FOR CHARGING A BATTERY OF AN ELECTRIC VEHICLE," the contents of which are incorporated in full by reference herein.

TECHNICAL FIELD

The present disclosure relates to a charging system for charging a battery of an electric vehicle, an electric vehicle including a charging system, a use of a charging system in an electric vehicle and a method for charging a battery of an electric vehicle.

BACKGROUND

Electric vehicles have a battery having a predefined rated voltage. At present, the most common rated voltage for batteries of electric vehicles is approximately 400V, but electric vehicles having a battery of approximately 800V rated voltage are also known. A battery having a rated voltage of approximately 800V, also referred to as a 800V-battery, can provide a higher power density than a battery having a rated voltage of approximately 400V, also referred to as a 400V-battery, of the same size, when being supplied with the same electric current. Further, an 800V-battery can reduce the charging time required for charging the battery. At present, most of the existing charging stations are configured as so called 400V fast-chargers, capable of up to 500V. To enable the use of 400V fast-chargers with an 800V-battery electric vehicle, a 400/800V-booster DC/DC voltage converter is needed.

SUMMARY

There may, therefore, be a need to provide an alternative charging system and method, particularly a system and method providing an increased compatibility with different charging stations.

The object of the present disclosure is solved by the subject-matter of the appended independent claims, wherein further embodiments are incorporated in the dependent claims.

According to a first aspect, there is provided a charging system for charging a battery of an electric vehicle. The charging system includes a charging inlet, a high voltage battery having a nominal voltage of 400V or of 800V, a DC/DC-converter and at least three circuit breakers. The charging inlet is configured to be connected to an external direct current (DC) charging station, preferably a fast-charge DC-charging station, providing a predefined charging inlet voltage, preferably of 400V and/or of 800V. The high voltage battery is connected to the charging inlet and includes two 400V-battery unit, and a voltage outlet. The two 400V-battery units are selectively connected in parallel or in series. The voltage outlet is configured to supply an output voltage to at least one auxiliary component connected to the voltage outlet, wherein the at least one auxiliary component has a nominal voltage that corresponds to the nominal voltage of the battery. The DC/DC converter is configured to convert the charging inlet voltage into the nominal voltage of the at least one auxiliary component, if the charging inlet voltage is different from the nominal voltage of the at least one auxiliary component. The at least three circuit breakers are arranged to selectively connect the two 400V-battery units to form a charging circuit having a nominal charging voltage which corresponds to the supplied charging inlet voltage, and/or to selectively integrate the DC/DC converter into the charging circuit to provide the at least one auxiliary component with the nominal voltage of the auxiliary component during charging. The circuit breakers are preferably simple contactors.

The term "charging inlet voltage of 400V" used herein, refers to charging inlet voltages of 250 up to 500V, as the DC-charging station providing the charging inlet voltage can adapt the charging inlet voltage to the voltage and current setpoint of the battery, which can vary depending on an operation point and/or a design of the battery, as outlined below. The charging station may adapt the provided charging inlet voltage by means of power electronics included in the charging station. For the same reasons, the term "charging inlet voltage of 800V" used herein, refers to charging inlet voltages of 500V up to 1000V.

The voltage of the battery can vary depending on an operation point of the battery and/or the design of the battery. The operation point may be defined by a current and/or a state-of-charge of the battery and/or a temperature of the battery etc. With regard to the design of the battery, particularly the number of battery units, or battery cells, included in the battery and connected in series with each other may affect the actual battery voltage. Therefore, the terms "battery having a nominal voltage of 400V" and "400V-battery" refer to batteries with a voltage of 250V to 500V, and the terms "battery having a nominal voltage of 800V" and "800V-battery" refer to batteries with a voltage of 500V to 1000V.

The charging system allows charging a battery of an electric vehicle having a nominal voltage of 400V with both, a charging inlet voltage of 400V and a charging inlet voltage of 800V, as well as charging a battery of an electric vehicle having a nominal voltage of 800V with both, the charging inlet voltage of 800V and the charging inlet voltage of 400V, without noticeably increasing the charging time. This enables to optimize a charging time independent of the fact, if the charging inlet voltage corresponds to or differs from the nominal voltage of the battery. Further, the charging system provides an increased flexibility by being compatible to both existing charging stations, the 400V-charging station and the 800V-charging station.

The battery includes the two 400V-battery units, which are switchably interconnected to be connected either in series or in parallel. Therefore, the charging system allows the battery to change its nominal voltage during charging. That means, the battery has a predefined nominal or rated voltage during load and can adapt its nominal charging voltage to the charging inlet voltage by changing the connection between the two 400V-battery units from a load circuit to the charging circuit.

The predefined nominal voltage of the battery refers to the rated voltage and is defined as the nominal voltage of the battery, as outlined above, during load. During load, the battery is in a load state supplying power to other components, e.g. the at least one auxiliary component, thus, the two 400V-battery units are connected with each other according to the load circuit. The battery may have either a nominal voltage of 400V or a nominal voltage of 800V. The nominal charging voltage corresponds to the charging inlet voltage supplied by the charging inlet, e.g. an electric vehicle inlet (EVI). Further, the nominal charging voltage is defined as the nominal voltage of the battery during charging. For example, a battery having a nominal voltage of 400V can have either a nominal charging voltage of 400V or a nominal charging voltage of 800V.

Further, the charging system uses the circuit breakers to re-arrange the connection between the two 400V-battery units to change the voltage of the battery between 400V and 800V together with a small 400/800V-DC/DC converter to supply high voltage power to the at least one auxiliary component.

Furthermore, the costs of the charging system are reduced since the DC/DC converter power rating is reduced.

The output voltage configured to power the at least one auxiliary component corresponds to the nominal voltage of the auxiliary component and thus, corresponds to the nominal voltage of the battery. Additionally by charging a battery having a nominal voltage of 400V at a charging station providing a charging inlet voltage of 800V, the charging power is increased. The at least one auxiliary component may be a high voltage (HV) coolant heater, an electric alternating current (AC) compressor etc. The system allows using carry-over components as auxiliary components having the nominal voltage of 400V. Thus, no special modifications are required to their isolation system. Additionally to the auxiliary components, the carry-over components can be external DC fast-chargers, motor drive systems etc.

Additionally, the charging system enables selling and charging electric vehicles having an 800V-battery in countries having restrictions regarding permissible charging voltages, e.g. Japan limits the charging voltages to maximum 750V for "non-trained" people.

According to an embodiment, the DC/DC-converter may be arranged within the battery or within the charging inlet. Additionally, or alternatively, the DC/DC-converter may be an isolated DC/DC-converter.

The isolated DC/DC-converter may be galvanically isolated and may prevent an occurrence of an overvoltage due to an isolation fault in the higher voltage part of the charging system, if the charging inlet voltage is different from the nominal voltage of the at least one auxiliary component, particularly if the charging inlet voltage is lower than the nominal voltage of the at least one auxiliary component. At the same time, the isolation voltage withstand requirements, defined by several standards, e.g. IEC standards, is maintained by maintaining the maximum working voltage in the galvanic system, namely, the isolated DC/DC-converter. This may result in a lower cost for the at least one auxiliary component and may enable the compatibility with existing fast-charge DC-charging stations.

According to an embodiment, the battery may further include two additional circuit breakers configured to de-energize the charging inlet during driving of the electric vehicle.

A de-energized charging inlet may be particularly advantageous in situations in which live voltage parts close to a periphery of the vehicle, such as the charging inlet, could be exposed, e.g. in case of a car crash.

According to an embodiment, the battery may further include a 400/12V-DC/DC-converter for each 400V-battery unit, the 400/12V-DC/DC-converter being connected in parallel to the respective 400V-battery unit.

The 400/12V-DC/DC-converter may be configured to supply auxiliary components having a nominal voltage of approximately 12V, such as an on-board system of the electric vehicle etc. By providing one 400/12V-DC/DC-converter for each 400V-battery unit being connected in parallel, the state-of-charge (SoC) for both 400V-battery units may be obtained similar keeping the battery balanced. This may allow increasing the usable energy of the battery, since the usable energy is limited by the SoC-spread in the battery.

According to an embodiment, the battery may further include one 400/12V-DC/DC-converter connected in parallel to the at least one auxiliary component.

The 400/12V-DC/DC-converter may be configured to supply auxiliary components having a nominal voltage of 12V, such as an on-board system of the electric vehicle etc. The 400/12V-DC/DC-converter and the at least one auxiliary component may further balance the battery by discharging the most charged 400V-battery unit while the other 400V-battery unit is disconnected.

According to an embodiment, in case, the nominal voltage of the battery may correspond to the charging inlet voltage, the charging circuit may correspond to a load circuit of the battery.

The charging circuit may be defined at least as the circuit connecting the two 400V-battery units during charging. The load circuit may be defined at least as the circuit connecting the two 400V-battery units during load, e.g. during driving. In case, the nominal voltage of the battery may correspond to the charging inlet voltage, no adaptations of the circuit, meaning no switching of the connection of the two 400V-battery units may be needed. For example, a 400V-battery may be charged with a charging inlet voltage of 400V, a 800V-battery may be charged with a charging inlet voltage of 800V, etc.

According to an embodiment, in case the nominal voltage of the battery may be different to the charging inlet voltage, the charging circuit may be different to the load circuit.

In case, the nominal voltage of the battery may be different to the charging inlet voltage, adaptations of the circuit, meaning switching of the connection of the two 400V-battery units may be needed. For example, a 400V-battery may be charged with a charging inlet voltage of 800V, an 800V-battery may be charged with a charging inlet voltage of 400V, etc.

According to an embodiment, the two 400V-battery units may be connected in series to form a one-string-battery having a nominal voltage of 800V.

According to Kirchhoff's circuit laws, the voltage of a string including at least two serially connected electrical resistances is the sum of the voltage of each electrical resistance of the string.

According to an embodiment, the two 400V-battery units may be connected in parallel to form a two-string-battery having a nominal voltage of 400V.

According to Kirchhoff's circuit laws, the voltage of at least two strings being in parallel is constant, and therefore each string is provided with the same voltage.

According to an embodiment, the two 400V-battery units may be re-connected in parallel during charging and the DC/DC-converter may be integrated into the charging circuit having a nominal charging voltage of 400V.

Additionally, according to an embodiment, the DC/DC-converter may be configured to balance a state-of-charge of the two 400V-battery units.

Thus, the DC/DC-converter may keep the state-of-charge (SoC) for both 400V-battery units similar, e.g. by discharging the most charged 400V-battery unit while the other 400V-battery unit is disconnected. This may allow increasing the usable energy of the battery, since the usable energy is limited by the SoC-spread in the battery.

According to an embodiment, the two 400V-battery units may be re-connected in series during charging and the isolated DC/DC-converter may be integrated into the charging circuit having a nominal charging voltage of 800V.

The two 400V-battery units of the battery may be arranged such that the electric circuit connecting the two 400V-battery units may be switchable. The switchable circuit may allow to change the connection of the two 400V-battery units from a series connection to a parallel connection and vice versa.

According to a second aspect, there is provided an electric vehicle including a charging system according to the first aspect, and at least one auxiliary component being connected to the voltage outlet of the charging system.

According to an embodiment, the electric vehicle may further include several auxiliary components being connected in parallel to the voltage outlet of the charging system.

By connecting the several auxiliary components in parallel, all of the connected auxiliary components may be supplied with the output voltage provided by the voltage outlet.

According to a third aspect, there is provided a use of a charging system according to the first aspect in an electric vehicle, preferably according to the second aspect.

According to a fourth aspect, there is provided a method for charging a battery of an electric vehicle, the method including the following steps, not necessarily in this order:
- connecting a charging inlet of the electric vehicle to an external direct current (DC) charging station providing a charging inlet voltage of 400V or 800V,
- supplying the charging inlet voltage to a (high voltage) battery having a nominal voltage of 400V or of 800V connected to the charging inlet,
- forming a charging circuit having a nominal charging voltage which corresponds to the supplied charging inlet voltage by selectively connecting two 400V-battery units of the battery in parallel to form a 400V-battery or in series to form a 800V-battery by means of at least three circuit breakers being arranged to connect the two 400V-battery units correspondingly;
- selectively integrating a DC/DC-converter into the charging circuit to convert an output voltage of the battery to a nominal voltage of at least one auxiliary component being connected to the battery, and
- supplying the output voltage to the at least one auxiliary component by means of an voltage outlet of the battery.

The method may be at least partly computer-implemented, and may be implemented in software and/or in hardware. Further, the method may be carried out by computer program instructions running on means that provide data processing functions. The data processing means may be a suitable computing means, such as an electronic control module etc., which may also be a distributed computer system. The method may allow charging a battery of an electric vehicle having a nominal voltage of 400V with both, a charging inlet voltage of 400V and a charging inlet voltage of 800V, as well as charging a battery of an electric vehicle having a nominal voltage of 800V with both, the charging inlet voltage of 800V and the charging inlet voltage of 400V, without noticeably increasing the charging time. This enables to optimize a charging time independent of the fact, if the charging inlet voltage corresponds to or differs from the nominal voltage of the battery. Further, the method provides an increased flexibility for charging a battery by being compatible to both existing charging stations, the 400V-charging station and the 800V-charging station.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

The figures are merely schematic representations and serve only to illustrate embodiments of the disclosure. Identical or equivalent elements are in principle provided with the same reference signs.

DETAILED DESCRIPTION

Figure 1:
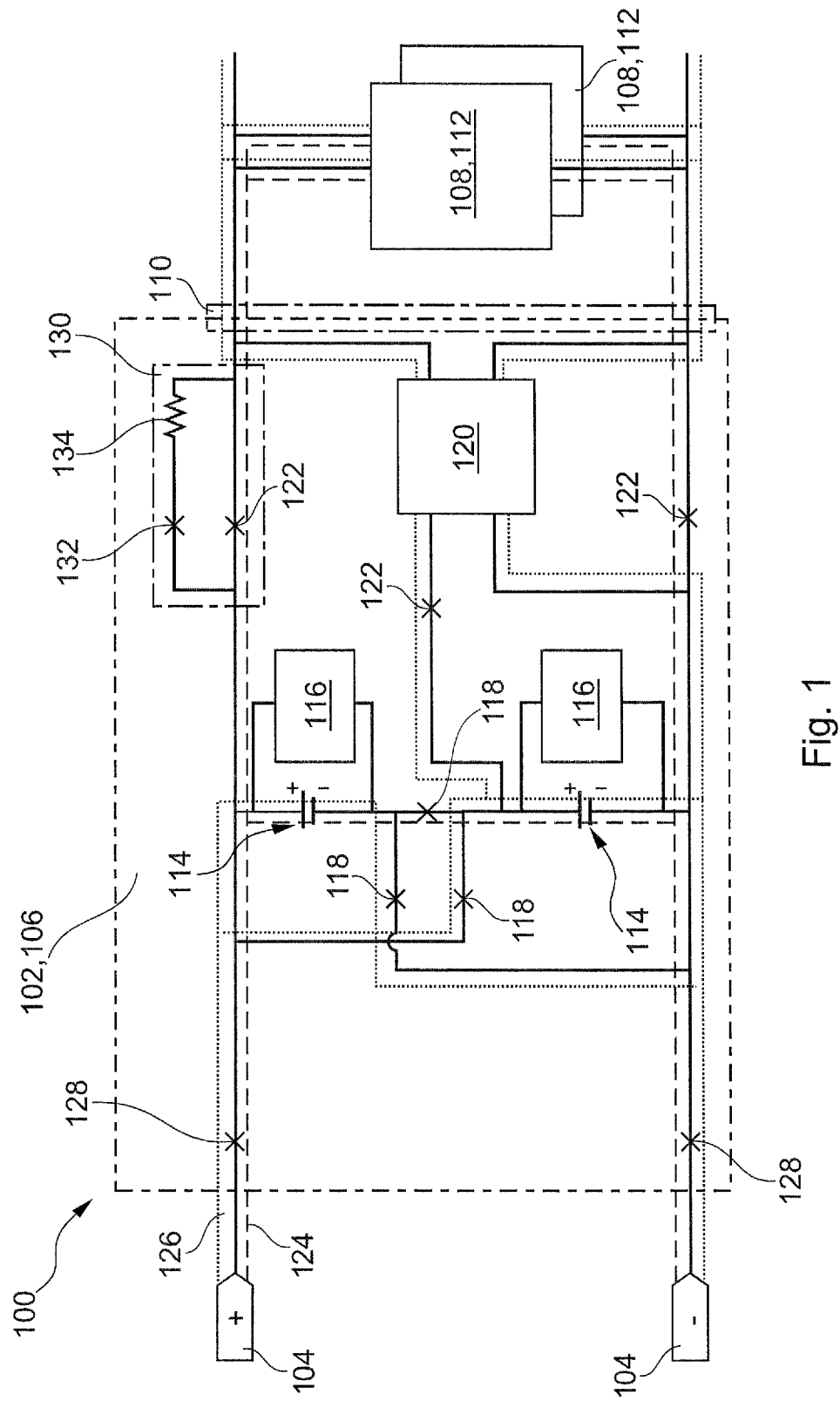
FIG. 1 shows a schematic view of an exemplary embodiment of a charging system for charging a battery of an electric vehicle.
Figure 2:
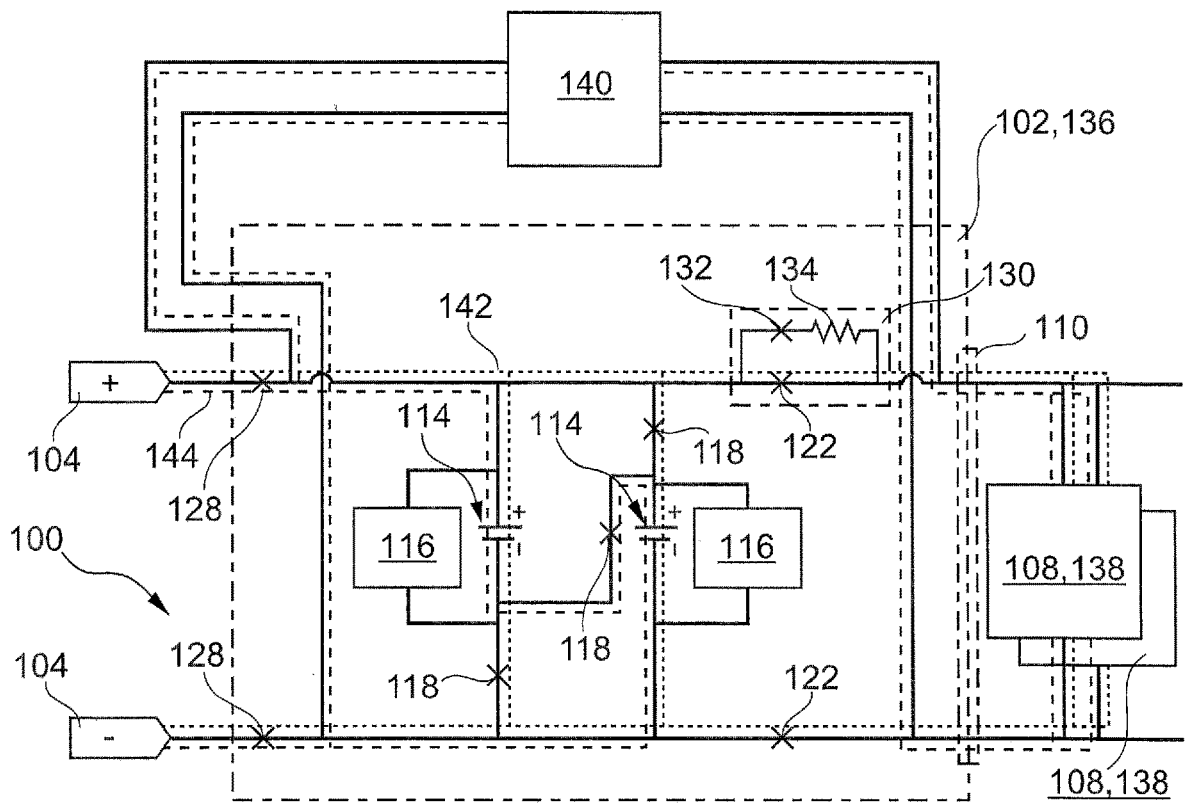
FIG. 2 shows a schematic view of an exemplary embodiment of a charging system for charging a battery of an electric vehicle.

FIGS. 1 and 2 show each a functional chart of a charging system 100 for charging a high voltage battery 102 of an electric vehicle (not illustrated), wherein FIG. 1 shows an embodiment of the charging system 100 for a battery 102 of a so called 800V battery electric vehicle and FIG. 2 shows an embodiment of the charging system 100 for a battery 102 of a so called 400V battery electric vehicle. For charging the battery 102, the charging inlet 104 can be connected to an external direct current (DC) charging station (not illustrated) providing a predefined charging inlet voltage. Common charging inlet voltages include 400V and 800V.

FIG. 1 shows an embodiment of a charging system 100 for charging a high voltage battery 102 of an 800V battery electric vehicle (not illustrated), wherein the battery 102 is an 800V-battery 106 having a nominal voltage of 800V, being the nominal or rated voltage during driving and/or load. In an 800V battery electric vehicle, auxiliary components 108 being included in the electric vehicle and connected in parallel to a voltage outlet 110 of the 800V-battery 106 for being supplied with power from the 800V-battery 106, are adapted to the nominal voltage of the 800V-battery 106, and therefore, also referred to as 800V-units 112.

The 800V-battery 106 includes two 400V-battery units 114, which are connected in series with each other during driving and/or load to provide an output voltage of 800V at the voltage outlet 110. Each of the two 400V-battery units 114 is connected in parallel with one 400/12V-DC/DC-converter 116, which are configured to convert the 400V of each 400V-battery unit 114 into approximately 12V for supplying further components in the electric vehicle with a 12V-power, such as an on-board system etc. Additionally, the 400/12V-DC/DC-converters 116 keep the 800V-battery 106 balanced, obtaining a similar State-of-Charge (SoC) for both 400V-battery units 114. This increases the useable energy of the 800V-battery 106. Alternatively, instead of providing the two 400/12V-DC/DC-converters, only one 800/12V-DC/DC-converter 116 may be provided, which will then be connected in parallel with the auxiliary components 112 to the voltage outlet 110. In this case, the auxiliary components 112 and the 800/12V-DC/DC-converter 116 balance the 800V-battery 106 by discharging the most charged 400V-battery unit 114 while the other 400V-battery unit 114 is disconnected.

To be compatible with a charging inlet voltage of 400V and a charging inlet voltage of 800V, the 800V-battery 106 is configured to provide a load circuit being a conductive circuit during driving and/or load and a charging circuit being the conductive circuit during charging, wherein the load circuit and the charging circuit may be different. Therefore, the 800V-battery 106 further includes three circuit breakers 118 configured to selectively change the connection between the two 400V-battery units 114 from the series connection to a parallel connection and vice versa to provide two different charging circuits. The circuit breakers 118 are preferably formed as simple contactors and controllably switchable. Additionally, the 800V-battery 106 includes a 400/800V-DC/DC-converter 120 connected to the conductive circuit such that the 400/800V-DC/DC-converter 120 is selectively integrated or excluded into or from the conductive circuit. For selectively integrating or excluding the 400/800V-DC/DC-converter 120 into or from the conductive circuit, three additional circuit breakers 122 are provided. The three circuit breakers 122 are arranged such that during charging the charging inlet 104 is either directly connected to the voltage outlet 110 or via the 400/800V-DC/DC-converter 120. The 400/800V-DC/DC-converter 120 is configured to provide an output voltage of 800V at the voltage outlet 110 for supplying the 800V-units 112 with an adequate voltage corresponding to the nominal voltage of the 800V-units 112. Furthermore, the 400V/800V-DC/DC-converter 120 may be integrated into the conductive circuit during driving and/or load by closing the one circuit breaker 122 connecting the 400/800V-DC/DC-converter with the conductive circuit being the load circuit. Thus, the 400/800V-DC/DC-converter 120 may be used to balance the state-of-charge of the two 400V-battery units 114, if they have different state-of-charge, thereby increasing the usable energy of the 800V-battery 106.

A first charging circuit 124 is configured to charge the 800V-battery 106 with a charging inlet voltage of 800V, illustrated in FIG. 1 by dashed lines. In this charging circuit 124, one of the three circuit breakers 118 is closed and the two remaining circuit breakers 118 are opened for connecting the two 400V-battery units 114 in series. As the charging inlet voltage is 800V, the charging inlet 104 can be directly connected with the voltage outlet 110 to provide the output voltage of 800V corresponding to the nominal voltage of the 800V-units 112, without integrating the 400/800V-DC/DC-converter 120 into the first charging circuit 124. Thus, two of the three circuit breakers 122 are closed, directly connecting the charging inlet 104 with the voltage outlet 110, and one circuit breaker 122 may be open to exclude the 400/800V-DC/DC-converter 120 from the first charging circuit 124.

The first charging circuit 124 corresponds to the load circuit of the 800V-battery 106. To avoid an excessive current surge at the 800V-units 112 at the beginning of the charging cycle, the first charging circuit 124 includes a pre-charge circuit 130 including a circuit breaker 132 configured as a contactor, and a resistor 134. The pre-charge circuit 130 is connected in parallel to the circuit breaker 122 directly connecting the charging inlet 104 with the voltage outlet 110. The pre-charge circuit 130 is configured to be shortly integrated into the charging circuit 124 for a predefined time interval, at the beginning of the charging cycle prior to closing the circuit breaker 122 being connected in parallel to the pre-charge circuit 130. Thus, during the predefined time interval the circuit breaker 132 is closed and is switched to be open again when the predefined time interval is expired.

A second charging circuit 126 is configured to charge the 800V-battery 106 with a charging inlet voltage of 400V, illustrated in FIG. 1 by dotted lines. In this charging circuit 126, the state of the three circuit breakers 118 is reversed compared to that of the first charging circuit 124, that means the state of two of the three circuit breakers 118 is switched from open to closed and the state of the one remaining circuit breaker 118 is switched from closed to open for connecting the two 400V-battery units 114 in parallel. As the charging inlet voltage is 400V, the charging inlet voltage needs to be converted to provide the output voltage of 800V at the voltage outlet 110. Therefore, the two circuit breakers 122 directly connecting the charging inlet 104 with the voltage outlet 110 are open, and the circuit breaker 122 integrating the 400/800V-DC/DC-converter 120 into the second charging circuit 126 is closed.

Furthermore, the 800V-battery 106 includes two circuit breakers 128, arranged close to the charging inlet 104. The circuit breakers 128 are configured to de-energize the charging inlet 104 during driving. Further, they are configured to be open until the charging circuit of the 800V-battery 106 is adapted to the charging inlet voltage provided at the charging inlet 104 being connected to a DC-charging-station, this means, until the charging circuit of the 800V-battery 106 is formed as either the first charging circuit 124 or the second charging circuit 126. Additionally, the circuit breakers 128 are configured to be open until the charging inlet voltage provided at the charging inlet 104 is adapted to the actual voltage of the charging circuit. Often DC-breakers have less breaking capacity in one direction, and the circuit breakers 128 may be optimized for breaking charging current, as opposed to the other known breakers.

In other words, one can say that the charging system 100 includes an arrangement of circuit breakers 118 that enables the 800V-battery 106 having one string to be re-arranged or re-configured as a 400V-battery with two string during 400V-charging, namely during charging with a charging inlet voltage of 400V. The 400/800V-DC/DC-converter 120 supplies a voltage of 800V to the 800V-units 112 during the 400V-charging. In addition to the 400/800V-DC/DC-converter 120, three additional circuit breakers 122 are needed.

It should be noted that the number and/or position of the circuit breakers 118, 122 is only exemplary and does not limit the scope of the claims. Further, all combinations leading to the same result should be seen as equivalent embodiments.

FIG. 2 shows an embodiment of a charging system 100 for charging a high voltage battery 102 of an 400V battery electric vehicle (not illustrated), wherein the battery 102 is an 400V-battery 136 having a nominal voltage of 400V, being the nominal or rated voltage during driving and/or load. In an 400V battery electric vehicle, auxiliary components 108 being included in the electric vehicle and connected in parallel to the voltage outlet 110 of the 400V-battery 136 for being supplied with power from the 400V-battery 136, are adapted to the nominal voltage of the 400V-battery 136, and therefore, also referred to as 400V-units 138.

The 400V-battery 136 includes two 400V-battery units 114, which are connected in parallel with each other during driving and/or load to provide an output voltage of 400V at the voltage outlet 110. Each of the two 400V-battery units 114 is connected in parallel with one 400/12V-DC/DC-converter 116, which are configured to convert the 400V of each 400V-battery unit 114 into 12V for supplying further components in the electric vehicle with a 12V-power, such as an on-board system etc. Additionally, the 400/12V-DC/DC-converters 116 may be used to keep the 400V-battery 136 balanced, obtaining a similar State-of-Charge (SoC) for both 400V-battery units 114. This increases the useable energy of the 400V-battery 106. Alternatively, only one 400/12V-DC/DC-converter 116 may be provided, which will then be connected in parallel with the auxiliary components 112 to the voltage outlet 110. In this case, the auxiliary components 112 and the 400/12V-DC/DC-converter 116 balance the 400V-battery 136 by discharging the most charged 400V-battery unit 114 while the other 400V-battery unit 114 is disconnected.

To be compatible with a charging inlet voltage of 400V and a charging inlet voltage of 800V, the 400V-battery 136 is configured to provide a load circuit being a conductive circuit during driving and/or load and a charging circuit being the conductive circuit during charging, wherein the load circuit and the charging circuit may be different. Therefore, the 400V-battery 136 further includes the three circuit breakers 118 configured to selectively change the connection between the two 400V-battery units 114 from the parallel connection to a series connection and vice versa to provide two different charging circuits. Additionally, the 400V-battery 136 includes an isolated 800/400-DC/DC-converter 140 connected in parallel to the two 400V-battery units 114. The isolated 800/400V-DC/DC-converter 140 is controllable to be either activated or deactivated, and is configured to provide an output voltage of 400V at the voltage outlet 110 for supplying the 400V-units 138 with an adequate voltage corresponding to the nominal voltage of the 400V-units 138. Further, the two circuit breakers 122 configured to selectively connect the charging inlet 104 directly with the voltage outlet 110 are provided.

A first charging circuit 142 is configured to charge the 400V-battery 136 with a charging inlet voltage of 400V, illustrated in FIG. 1 by dotted lines. In this charging circuit 142, two of the three circuit breakers 118 are closed and the one remaining circuit breaker 118 is open for connecting the two 400V-battery units 114 in parallel. As the charging inlet voltage is 400V, the charging inlet 104 can be directly connected with the voltage outlet 110 to provide the output voltage of 400V corresponding to the nominal voltage of the 400V-units 138, without needing the isolated 800/400V-DC/DC-converter 140. Thus, the isolated 800/400V-DC/DC-converter 140 is deactivated and the two circuit breakers 122 are closed to directly connect the charging inlet 104 with the voltage outlet 110.

The first charging circuit 142 corresponds to the load circuit of the 400V-battery 136. To avoid an excessive current surge at the 400V-units 138 at the beginning of the charging cycle, the first charging circuit 142 includes the pre-charge circuit 130 including the circuit breaker 132 configured as a contactor, and the resistor 134. The pre-charge circuit 130 is connected in parallel to the circuit breaker 122 directly connecting the charging inlet 104 with the voltage outlet 110. The pre-charge circuit 130 is configured to be shortly integrated into the charging circuit 142 for a predefined time interval at the beginning of the charging cycle prior to closing the circuit breaker 122 being connected in parallel to the pre-charge circuit 130. Thus, during the predefined time interval the circuit breaker 132 is closed and is switched to be open again when the predefined time interval is expired.

A second charging circuit 144 is configured to charge the 400V-battery 136 with a charging inlet voltage of 800V, illustrated in FIG. 2 by dashed lines. In this charging circuit 144, the state of the three circuit breakers 118 is reversed to that of the first charging circuit 142, that means the state of two of the three circuit breakers 118 is switched from open to closed and the state of the one remaining circuit breaker 118 is switched from closed to open for connecting the two 400V-battery units 114 in series. As the charging inlet voltage is 800V, the charging inlet voltage needs to be converted to provide the output voltage of 400V at the voltage outlet 110. Therefore, the two circuit breakers 122 directly connecting the charging inlet 104 with the voltage outlet 110 are open, and the isolated 400/800V-DC/DC-converter 140 is activated to be integrated into the second charging circuit 144.

Furthermore, the 400V-battery 136 includes the two circuit breakers 128, arranged close to the charging inlet 104. The circuit breakers 128 are configured to de-energize the charging inlet 104 during driving. Further, they are configured to be open until the charging circuit of the 400V-battery 136 is adapted to the charging inlet voltage provided at the charging inlet 104 being connected to a DC-charging-station, this means, until the charging circuit of the 400V-battery 136 is formed as either the first charging circuit 142 or the second charging circuit 144. Additionally, the circuit breakers 128 are configured to be open until the charging inlet voltage provided at the charging inlet 104 is adapted to the actual voltage of the charging circuit. Often DC-breakers have less breaking capacity in one direction, and the circuit breakers 128 may be optimized for breaking charging current, as opposed to the other known breakers.

In other words, one can say that the charging system 100 includes an arrangement of circuit breakers 118 that also enables the 400V-battery 136 having two strings to be re-arranged or re-configured as an 800V-battery with one string during 800V-charging, namely during charging with a charging inlet voltage of 800V. The isolated 800/400V-DC/DC-converter 140 supplies a voltage of 400V to the 400V-units 138 during the 800V-charging. In addition to the isolated 800/400V-DC/DC-converter 140, at least two additional circuit breakers 122 are needed.

It should be noted that the number and/or position of the circuit breakers 118, 122 is only exemplary and does not limit the scope of the claims. Further, all combinations leading to the same result should be seen as equivalent embodiments.

Figure 3:
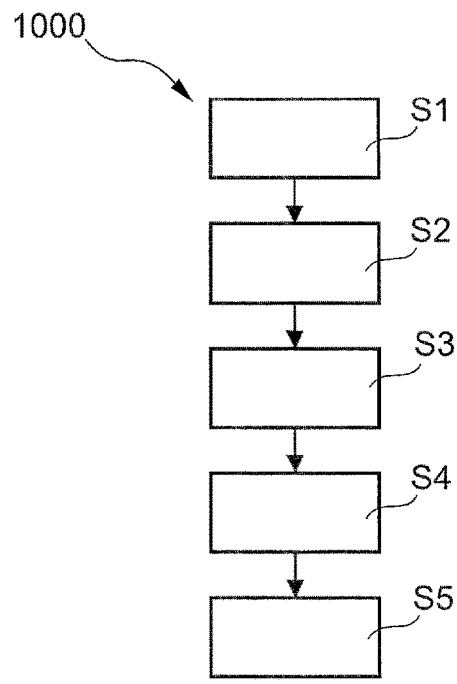
FIG. 3 shows a flowchart, schematically illustrating an exemplary embodiment of a method for charging a battery of an electric vehicle.

FIG. 3 shows a flowchart, schematically illustrating an exemplary embodiment of a method 1000 for charging a battery 102 of an electric vehicle. The method 1000 includes the following steps, not necessarily in this order:

In a step S1, the charging inlet 104 of the electric vehicle is connected to an external DC-charging station providing a charging inlet voltage of 400V or 800V The charging inlet voltage may be provided to the battery 102 having a nominal voltage of either 400V or 800V, connected to the charging inlet 104. The DC-charging station may provide the information of its charging inlet voltage to the electric vehicle via a data link. In a step S2, the charging circuit having a nominal charging voltage is formed based on the provided information. The nominal charging voltage corresponds to the supplied charging inlet voltage by selectively connecting the two 400V-battery units 114 of the battery 102 connected to the charging inlet 104, in parallel to form a 400V-charging circuit or in series to form a 800V-charging circuit by means of the at least three circuit breakers 118 being arranged to connect the two 400V-battery units 114 correspondingly. In a step S3, a, preferably isolated, DC/DC-converter 120, 140 is selectively integrated into the charging circuit to convert an output voltage of the battery 102 to a nominal voltage of at least one auxiliary component 108 being connected to the battery 102. In a step S4, the charging inlet voltage is supplied to the battery 102. The nominal charging voltage of the battery 102 corresponds to the charging inlet voltage. In a step S5, the output voltage is supplied to the at least one auxiliary component 108 by means of the voltage outlet 110 of the battery 102.

Other variations to the disclosed embodiments can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A charging system for charging a battery of an electric vehicle, comprising:
    a charging inlet configured to be connected to an external direct current (DC) charging station providing a predefined charging inlet voltage;
    a battery having a nominal voltage of 400V or 800V connected to the charging inlet;
    the battery comprising
        two 400V-battery units, the two 400V-battery units being selectively connected in parallel or in series, and
        a voltage outlet, the voltage outlet being configured to supply an output voltage to at least one auxiliary component connected to the voltage outlet, the at least one auxiliary component having a nominal voltage corresponding to the nominal voltage of the battery;
    a DC/DC converter configured to convert the charging inlet voltage into the nominal voltage of the at least one auxiliary component; and
    at least three circuit breakers being arranged to connect the two 400V-battery units to form a charging circuit having a nominal charging voltage corresponding to the supplied charging inlet voltage and to selectively integrate the DC/DC converter into the charging circuit to provide the at least one auxiliary component with the nominal voltage of the auxiliary components during charging.

2. The system according to claim 1, the DC/DC-converter being arranged within the battery or within the charging inlet, and/or the DC/DC-converter being an isolated DC/DC-converter.

3. The system according to claim 1, the battery further comprising two additional circuit breakers configured to de-energize the charging inlet during driving of the electric vehicle.

4. The system according to claim 1, the battery further comprising a 400/12V-DC/DC-converter for each 400V-battery unit, the 400/12V-DC/DC-converter being connected in parallel to the respective 400V-battery unit.

5. The system according to any of claim 1, the battery further comprising one 400/12V-DC/DC-converter connected in parallel to the at least one auxiliary component.

6. The system according to claim 1, in case, the nominal voltage of the battery corresponding to the charging inlet voltage, the charging circuit corresponding to a load circuit of the battery.

7. The system according to claim 6, in case the nominal voltage of the battery being different to the charging inlet voltage, the charging circuit being different to a load circuit of the battery.

8. The system according to claim 1, the two 400V-battery units being connected in series to form a battery having a nominal voltage of 800V.

9. The system according to claim 1, the two 400V-battery units being connected in parallel to form a battery having a nominal voltage of 400V.

10. The system according to claim 8, the two 400V-battery units being re-connected in parallel during charging and the DC/DC-converter being integrated into the charging circuit.

11. The system according to claim 10, the DC/DC-converter being configured to balance a state-of-charge of the two 400V-battery units.

12. The system according to claim 9, the two 400V-battery units being re-connected in series during charging and the DC/DC-converter being integrated into the charging circuit.

13. An electric vehicle, comprising:
    a charging system according to claim 1, and
    at least one auxiliary component being connected to the voltage outlet of the battery.

14. A method for charging a battery of an electric vehicle, the method comprising:
    connecting a charging inlet of the electric vehicle to an external direct current (DC) charging station providing a charging inlet voltage of 400V or 800V;
    forming a charging circuit having a nominal charging voltage which corresponds to the supplied charging inlet voltage by selectively connecting two 400V-battery units of a battery connected to the charging inlet, in parallel or in series by means of at least three circuit breakers being arranged to connect the two 400V-battery units correspondingly;
    selectively integrating a DC/DC-converter into the charging circuit to convert an output voltage of the battery to a nominal voltage of at least one auxiliary component being connected to the battery;
    supplying the charging inlet voltage to the battery; and
    supplying the output voltage to the at least one auxiliary component by means of a voltage outlet of the battery.

* * * * *